(12) United States Patent
Ma

(10) Patent No.: US 8,973,731 B2
(45) Date of Patent: Mar. 10, 2015

(54) REGENERATIVE POWER CONTROL FOR PASSENGER CONVEYORS

(75) Inventor: GuangHua Ma, Changlang (CN)

(73) Assignee: Otis Elevator Company, Farmington, CT (US)

( * ) Notice: Subject to any disclaimer, the term of this patent is extended or adjusted under 35 U.S.C. 154(b) by 2 days.

(21) Appl. No.: 13/993,873

(22) PCT Filed: Dec. 17, 2010

(86) PCT No.: PCT/US2010/060906
§ 371 (c)(1),
(2), (4) Date: Jun. 13, 2013

(87) PCT Pub. No.: WO2012/082134
PCT Pub. Date: Jun. 21, 2012

(65) Prior Publication Data
US 2013/0270061 A1 Oct. 17, 2013

(51) Int. Cl.
*B66B 25/00* (2006.01)
*B66B 23/02* (2006.01)

(52) U.S. Cl.
CPC .............. *B66B 25/003* (2013.01); *B66B 23/02* (2013.01); *B66B 25/00* (2013.01); *Y02B 50/24* (2013.01)
USPC .......................................... 198/323; 198/322

(58) Field of Classification Search
USPC ........................... 198/322, 323, 326, 330, 619
See application file for complete search history.

(56) References Cited

U.S. PATENT DOCUMENTS

| 4,738,346 | A | 4/1988 | Matsueda et al. |
| 4,748,394 | A | 5/1988 | Watanabe |
| 4,916,368 | A | 4/1990 | Onoda et al. |
| 5,712,456 | A * | 1/1998 | McCarthy et al. ............ 187/290 |
| 6,049,189 | A | 4/2000 | Markus et al. |
| 6,155,401 | A | 12/2000 | Lunardi et al. |
| 6,626,279 | B2 | 9/2003 | Henkel et al. |
| 6,634,463 | B2 | 10/2003 | Spannhake et al. |
| 6,782,989 | B2 | 8/2004 | Spannhake et al. |
| 7,837,011 | B2 * | 11/2010 | Takasaki et al. .............. 187/296 |
| 2002/0189905 | A1 | 12/2002 | Spannhake et al. |

FOREIGN PATENT DOCUMENTS

| CN | 101054148 A | 10/2007 |
| JP | 62-121276 | 8/1987 |
| JP | 62-188993 | 12/1987 |

(Continued)

OTHER PUBLICATIONS

International Preliminary Report on Patentability for International application No. PCT/US2010/060906 dated Jun. 27, 2013.

(Continued)

*Primary Examiner* — Leslie A Nicholson, III
(74) *Attorney, Agent, or Firm* — Carlson, Gaskey & Olds

(57) ABSTRACT

An exemplary device for controlling power associated with a passenger conveyor motor includes a regenerative drive that is configured to facilitate providing electricity generated by the motor to a power source when the passenger conveyor is moving. The controller determines when an operating condition of the regenerative drive is outside of a desired range and responsively prevents the regenerative drive from facilitating providing the electricity to the power source.

17 Claims, 1 Drawing Sheet

(56) References Cited

FOREIGN PATENT DOCUMENTS

| | | | |
|---|---|---|---|
| JP | 2000229776 A | 8/2000 | |
| JP | 2003146570 A | 5/2003 | |
| JP | 2005324884 A | 11/2005 | |
| KR | 20100085417 A | 7/2010 | |

OTHER PUBLICATIONS

International Search Report and Written Opinion of the International Searching Authority for International application No. PCT/US2010/060906 dated Aug. 31, 2011.

\* cited by examiner

REGENERATIVE POWER CONTROL FOR PASSENGER CONVEYORS

BACKGROUND

An escalator is one type of passenger conveyor. Escalators have proven useful for carrying passengers between different levels of a building, for example. Typical escalator systems include a plurality of steps that move based upon operation of a motor and drive system.

In an effort to reduce energy consumption, it has been proposed to operate a passenger conveyor in a regenerative mode in which the motor operates as a generator for providing electricity to a source of power when the steps are moving downward. One drawback associated with previous proposals in this regard is that they are limited to relatively light duty escalator systems. Larger currents associated with heavier duty escalator motors require relatively expensive regenerative drive components for handling the relatively high currents that occur in a regenerative mode. The additional expense of such components tends to outweigh any cost-savings benefit that might be obtained using a regenerative drive.

SUMMARY

An exemplary device for controlling power associated with a passenger conveyor motor includes a regenerative drive that is configured to facilitate providing electricity generated by the motor to a power source when the passenger conveyor is moving. The controller determines when an operating condition of the regenerative drive is outside of a desired range and responsively prevents the regenerative drive from facilitating providing the electricity to the power source.

An exemplary method of controlling power associated with a passenger conveyor motor includes generating electricity from the motor when the passenger conveyor is moving. A regenerative drive facilitates providing the electricity to a power source. A determination is made when an operating condition of the regenerative drive is outside of a desired range. The regenerative drive is then prevented from facilitating providing the electricity to the power source.

An exemplary passenger conveyor includes a plurality of steps. A motor is associated with the steps for selectively moving the steps. A regenerative drive is configured to facilitate providing electricity generated by the motor to a power source when the steps are moving. The controller determines when at least one of a current or a temperature of the regenerative drive is outside of a desired range. The controller then responsively prevents the regenerative drive from facilitating providing the electricity to the power source.

The various features and advantages of the disclosed example will become apparent to those skilled in the art from the following detailed description. The drawings that accompany the detailed description can be briefly described as follows.

DETAILED DESCRIPTION

Figure 1:
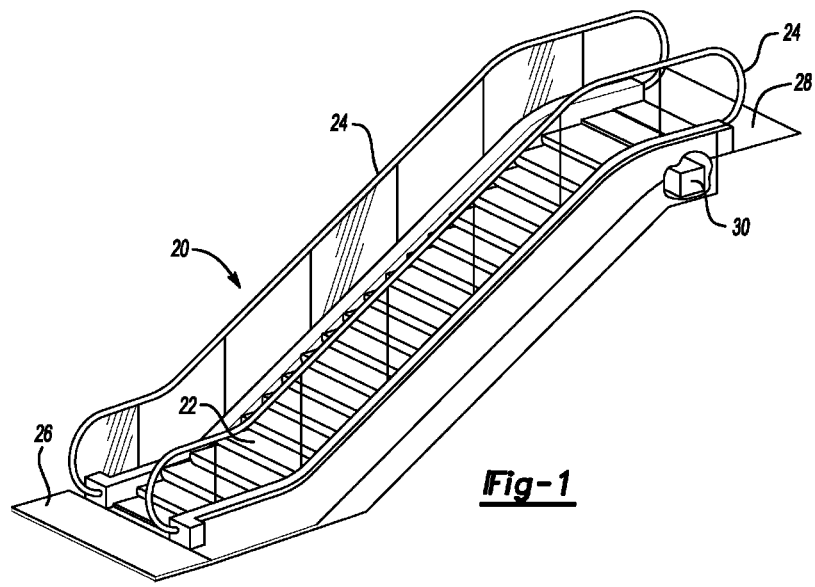
FIG. 1 diagrammatically illustrates selected portions of an example passenger conveyor including a power control device designed according to an embodiment of this invention.

FIG. 1 illustrates a passenger conveyor 20. A plurality of steps 22 and a handrail 24 facilitate moving passengers between landings 26 and 28. The example passenger conveyor 20 is an escalator as the landings 26 and 28 are at different vertical positions or elevations.

The example passenger conveyor 20 includes a power control device 30 that controls whether a regenerative operating mode is used during selected operating conditions of the passenger conveyor 20.

Figure 2:
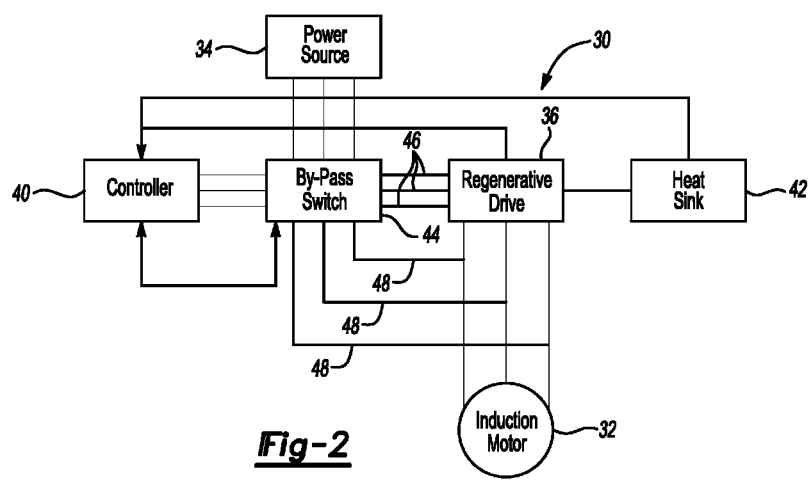
FIG. 2 schematically illustrates selected portions of an example power control device designed according to an embodiment of this invention.

FIG. 2 schematically illustrates an example power control device 30. A passenger conveyor motor 32 selectively causes the steps 22 to move in a desired direction (e.g., up or down) and at a desired speed. The motor 32 operates based upon power provided by a power source 34 such as a conventional power grid.

Under certain operating conditions of the passenger conveyor 20, it is possible to use the motor 32 for generating electricity based upon movement of the steps 22, which causes corresponding movement of appropriate components in the motor 32. The example of FIG. 2 includes a regenerative drive 36 that facilitates providing electricity generated by the motor 32 to the power source 34 in the regenerative mode. Although not specifically illustrated, the regenerative drive 36 includes an inverter and converter to provide an appropriate interface between the motor 32 and the power source 34 when the illustrated example is operating in a regenerative mode. One example includes a known configuration of the inverter and convertor.

A controller 40 selectively controls whether the regenerative drive 36 facilitates providing electricity generated by the motor 32 to the power source 34. The controller 40 determines whether at least one characteristic of the regenerative drive 36 is within a desired range. If that characteristic is outside of the desired range, the controller 40 prevents the regenerative drive 36 from facilitating providing electricity from the motor 32 to the power source 34.

In one example, the characteristic that the controller 40 monitors is the current of the regenerative drive 36. Under certain operating conditions of the motor 32 in a regenerative mode, the current will become high enough to generate heat at a level that could be damaging to one or more components of the regenerative drive 36 or other components of the power control device 30. In this example, the controller 40 monitors the current of the regenerative drive 36. When that current exceeds a pre-determined threshold, the controller 40 disables or prevents the regenerative drive 36 from facilitating providing electricity generated by the motor 32 to the power source 34. This protects the regenerative drive components and other portions of the power control device 30.

In one example, the threshold current corresponds to the passenger conveyor 20 carrying a load that is approximately 70% of a full rated load for the passenger conveyor 20. Known techniques allow for determining the current corresponding to such a load.

Another characteristic of the regenerative drive 36 that can be used by the controller 40 is a temperature of the regenerative drive. This example includes a heat sink 42 that is associated with the regenerative drive 36 to dissipate heat produced during the regenerative mode. The controller 40 in this example determines a temperature of the heat sink 48 and prevents the regenerative drive 36 from operating in the regenerative mode for providing electricity from the motor 32 to the power source 34 when the temperature exceeds a pre-selected threshold. In one example, the temperature threshold is selected to correspond to the passenger conveyor 20 being loaded at approximately 70% of a maximum rated load. Given this description, those skilled in the art will be able to determine an appropriate temperature threshold for their particular situation.

The illustrated example includes a bypass switch 44 between the power source 34 and the regenerative drive 36. The controller 40 controls the bypass switch to allow current flow between the power source 34 and the motor 32 through the regenerative drive 36 on the conductive lines 46 when the bypass switch 44 is set to a first operating state. When it is desirable to prevent the regenerative drive 36 from facilitating providing power from the motor 32 to the power source 34, the controller 40 changes the operating state of the bypass switch 44 so that the connection between the power source 34 and the motor 32 is along conductive lines 48. Under the latter circumstances, the regenerative drive 36 is disconnected from the power source 34 and bypassed so that it is not involved with any power transmission between the power source 34 and the motor 32. In one example, when the regenerative drive 36 is bypassed the motor 32 provides power directly to the power source 34.

In one example, the controller 40 determines which operative state to place the bypass switch 44 into based upon a direction of movement of the steps 22 of the passenger conveyor 20. In one example, when the steps 22 are moving in an upward direction, the controller 40 controls the bypass switch 44 so that power flows along the conductive lines 46 during a start-up of the passenger conveyor 20. Once the speed of the steps 22 reaches a rated speed, the controller 40 causes the bypass switch 44 to change its operative state so that power then flows along the conductive lines 48 and the regenerative drive 36 is no longer involved in power flow management between the power source 34 and the motor 32.

If the steps 22 are moving in a downward direction, the regenerative drive 36 can be used in the regenerative mode. Once a load on the steps 22 is sufficient to overcome friction, the motor 32 is not necessarily required to move the steps 22 at a desired speed. Under those conditions, the controller 40 causes the bypass switch 44 to connect the regenerative drive 36 and the conductive lines 46 between the power source 34 and the motor 32. In one example, turning on the regenerative drive 36 in this manner occurs when the passenger conveyor 20 is carrying a load that is approximately 30% of a maximum rated load.

While the regenerative drive 36 is operating to facilitate providing power from the motor 32 to the power source 34, the controller 40 is continuously monitoring the selected operating characteristic of the regenerative drive 36. Once the temperature or heat of the regenerative drive 36 exceeds the selected threshold (e.g., when the load on the conveyor 20 is greater than approximately 70% of a rated load), the controller 40 causes the bypass switch 44 to disconnect the conductive lines 46 and the regenerative drive 36 and instead to direct power conduction between the motor 32 and the power source 34 along the conductive lines 48. This allows for the regenerative drive to facilitate providing power from the motor 32 to the power source 34 under operating conditions that can be handled by the components of the regenerative drive 36. With the disclosed example, it is possible to incorporate a regenerative drive 36 that is configured for a relatively light duty passenger conveyor system to be used with a heavier duty passenger conveyor system without danger of overheating the regenerative drive components and without requiring more expensive regenerative drive components. By customizing the thresholds at which the regenerative drive 36 is involved in facilitating providing power between the motor 32 and the power source 34, the illustrated example expands the possible uses of a given regenerative drive configuration. Further, the illustrated example increases the possible number of passenger conveyor systems that can be used in a regenerative mode.

In one example, even if the threshold is exceeded, the controller 40 continues to monitor the current, heat or both. Once the selected characteristic is within the desired range, the regenerative drive 36 is reconnected between the motor 32 and the power source 34.

Another feature of the disclosed example is that if there is a problem or failure associated with the regenerative drive 36, the bypass switch 44 can be controlled to always direct power between the motor 32 and the power source 34 along the conductive lines 48.

Another feature of the illustrated example is that typical variable frequency control devices for passenger conveyors require a break resistor while the illustrated example eliminates the need for such a resistor. This provides additional cost savings as it eliminates the requirements for what can be considered a relatively expensive component.

The illustrated example selectively utilizes the regenerative drive 36 under selected operating conditions provided that a selected characteristic of the regenerative drive 36 (e.g., current, temperature or both) is within a desired operating range.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A device for controlling power associated with a passenger conveyor motor, comprising:
   a regenerative drive that is configured to facilitate providing electricity generated by the motor to a power source when the passenger conveyor is moving; and
   a controller that determines when an operating condition of the regenerative drive is outside of a desired range and responsively prevents the regenerative drive from facilitating providing the electricity to the power source,
   wherein the operating condition comprises current and the controller determines when the current exceeds a threshold.

2. A device for controlling power associated with a passenger conveyor motor, comprising:
   a regenerative drive that is configured to facilitate providing electricity generated by the motor to a power source when the passenger conveyor is moving; and
   a controller that determines when an operating condition of the regenerative drive is outside of a desired range and responsively prevents the regenerative drive from facilitating providing the electricity to the power source,
   wherein the operating condition comprises temperature and the controller determines when the temperature exceeds a threshold.

3. The device of claim 2, comprising a heat sink associated with the regenerative drive and wherein the controller determines the temperature at the heat sink.

4. A device for controlling power associated with a passenger conveyor motor, comprising:
   a regenerative drive that is configured to facilitate providing electricity generated by the motor to a power source when the passenger conveyor is moving; and
   a controller that determines when an operating condition of the regenerative drive is outside of a desired range and responsively prevents the regenerative drive from facilitating providing the electricity to the power source, comprising a bypass switch between the regenerative drive and the power source and wherein the controller controls the bypass switch to permit or prevent the regenerative drive from facilitating providing electricity to the power source.

5. A device for controlling power associated with a passenger conveyor motor, comprising:
a regenerative drive that is configured to facilitate providing electricity generated by the motor to a power source when the passenger conveyor is moving; and
a controller that determines when an operating condition of the regenerative drive is outside of a desired range and responsively prevents the regenerative drive from facilitating providing the electricity to the power source,
wherein the controller controls whether the regenerative drive facilitates providing the electricity to the power source dependent on a direction of movement of the passenger conveyor.

6. The device of claim 5, wherein the controller permits the regenerative drive to facilitate providing the electricity to the power source when the direction of movement is down and the operating condition is within the desired range.

7. The device of claim 6, wherein the desired range of the operating condition corresponds to a load on the passenger conveyor being between about 30% and about 70% of a full rated load for the conveyor.

8. The device of claim 5, wherein the controller permits the regenerative drive to be connected between the power source and the motor during a start up procedure when the direction of movement is up and the passenger conveyor is moving at a speed below a selected threshold speed and the controller otherwise disconnects the regenerative drive from the power source when the direction of movement is up.

9. A method of controlling power associated with a passenger conveyor motor, comprising the steps of:
generating electricity from the motor when the passenger conveyor is moving;
facilitating providing the electricity to a power source through a regenerative drive;
determining when an operating condition of the regenerative drive is outside of a desired range and responsively preventing the regenerative drive from facilitating providing the electricity to the power source; and
wherein the operating condition comprises current and the method comprises determining when the current exceeds a threshold.

10. The method of claim 9, wherein the operating condition comprises temperature and the method comprises determining when the temperature exceeds a threshold.

11. The method of clam 10, wherein there is a heat sink associated with the regenerative drive and the method comprises detecting the temperature at the heat sink.

12. The method of claim 9, wherein there is a bypass switch between the regenerative drive and the power source and the method comprises controlling the bypass switch to permit or prevent the regenerative drive from facilitating providing the electricity to the power source.

13. The method of claim 9, comprising controlling whether the regenerative drive facilitates providing the electricity to the power source dependent on a direction of movement of the passenger conveyor.

14. The method of claim 13, comprising permitting the regenerative drive to facilitate providing the electricity to the power source when the direction of movement is down and the operating condition is within the desired range.

15. The method of claim 14, wherein the desired range of the operating condition corresponds to a load on the passenger conveyor being between about 30% and about 70% of a full rated load for the conveyor.

16. The method of claim 13, comprising
permitting the regenerative drive to be connected between the power source and the motor during a start up procedure when the direction of movement is up and the passenger conveyor is moving at a speed below a selected threshold speed; and
otherwise disconnecting the regenerative drive from the power source when the direction of movement is up.

17. A passenger conveyor, comprising:
a plurality of steps;
a motor associated with the steps for selectively moving the steps;
a regenerative drive configured to facilitate providing electricity generated by the motor to a power source when the steps are moving;
a controller that determines when at least one of a current or a temperature of the regenerative drive is outside of a desired range and responsively prevents the regenerative drive from facilitating providing the electricity to the power source; and
a bypass switch between the regenerative drive and the power source and wherein the controller controls the bypass switch to permit or prevent the regenerative drive from facilitating providing electricity to the power source.

* * * * *